(12) United States Patent
Fossum et al.

(10) Patent No.: US 6,734,905 B2
(45) Date of Patent: May 11, 2004

(54) DYNAMIC RANGE EXTENSION FOR CMOS IMAGE SENSORS

(75) Inventors: Eric R. Fossum, La Crescenta, CA (US); Yibing Wang, Pasadena, CA (US); Barna L. Sandor, Pasadena, CA (US)

(73) Assignee: Micron Technology, Inc., Boise, ID (US)

(*) Notice: Subject to any disclaimer, the term of this patent is extended or adjusted under 35 U.S.C. 154(b) by 70 days.

(21) Appl. No.: 10/041,781

(22) Filed: Oct. 18, 2001

(65) Prior Publication Data

US 2002/0057845 A1 May 16, 2002

Related U.S. Application Data (60) Provisional application No. 60/242,215, filed on Oct. 20, 2000, provisional application No. 60/259,352, filed on Dec. 29, 2000, and provisional application No. 60/307,514, filed on Jul. 23, 2001.

(51) Int. Cl.[7] .......................... H04N 3/14; H04N 5/335
(52) U.S. Cl. ........................................................ 348/300
(58) Field of Search ............................... 348/294, 295, 348/300, 301; 330/185

(56) References Cited

U.S. PATENT DOCUMENTS

| | | | | |
|---|---|---|---|---|
| 3,737,794 A | * | 6/1973 | Kurz ............................. 330/9 |
| 5,387,930 A | * | 2/1995 | Toh ........................... 348/222.1 |
| 5,389,971 A | * | 2/1995 | Ishida et al. ................. 348/294 |
| 5,392,069 A | | 2/1995 | Koyama et al. |
| 5,572,256 A | * | 11/1996 | Egawa et al. ................ 348/296 |
| 5,708,263 A | * | 1/1998 | Wong ........................... 348/302 |
| 6,073,848 A | * | 6/2000 | Giebel ..................... 235/462.26 |
| 6,130,710 A | * | 10/2000 | Yasuda ..................... 348/220.1 |
| 6,137,533 A | * | 10/2000 | Azim ....................... 348/222.1 |
| 6,501,504 B1 | * | 12/2002 | Tatko et al. ............. 348/229.1 |

FOREIGN PATENT DOCUMENTS

| JP | 09-184823 | 7/1997 | | |
|---|---|---|---|---|
| JP | 09184823 A1 | * | 7/1997 | .......... G01N/27/62 |

* cited by examiner

Primary Examiner—Wendy R. Garber
Assistant Examiner—Jason T. Whipkey
(74) Attorney, Agent, or Firm—Dickstein Shapiro Morin & Oshinsky LLP (57) ABSTRACT

An image sensor for capturing and producing an image includes a photoreceptor array that receives light and produces a signal for each pixel of the image. The image sensor further includes amplification circuitry that amplifies the signals. The amplification circuitry provides two distinct gains for each of the signals to produce two output signal levels. The image sensor also includes a fusion module, which combines the two output signal levels into one signal level. Accordingly, overall dynamic range of the image sensor is increased.

26 Claims, 8 Drawing Sheets

DYNAMIC RANGE EXTENSION FOR CMOS IMAGE SENSORS

RELATED APPLICATIONS

This application claims priority to U.S. patent application No. 60/242,215 filed Oct. 20, 2000; U.S. patent application No. 60/259,352 filed Dec. 29, 2000; and U.S. patent application No. 60/307,514 filed Jul. 23, 2001.

TECHNICAL FIELD

This invention relates to dynamic range extension for CMOS image sensors.

BACKGROUND

A CMOS (Complementary Metal-Oxide Semiconductor) image sensor is an imaging device built with CMOS technology for capturing and processing light signals. Results produced by the CMOS image sensor can be displayed. Chips that are built based on CMOS technology may include transistors having two alternate polarities. CMOS chips are attractive because they require less power than chips using transistors with only a single polarity for battery-powered and handheld devices.

A type of CMOS image sensors, called a CMOS Active Pixel Sensors (APS), has been shown to be particularly suited for handheld imaging applications.

The CMOS APS comprises an array of pixel processing elements, each of which processes a corresponding pixel of a received image. Each of the pixel processing elements includes a photo-detector element (e.g., a photodiode or a photogate) for detecting brightness information in the received image, and active transistors (e.g., an amplifier) for reading out and amplifying the light signals in the received image. The amplification of the light signals allows circuitry in the CMOS APS to function correctly with even a small amount of the received light signals.

The CMOS APS also has color processing capabilities. The array of pixel processing elements employs a color filter array (CFA) to separate red, green, and blue information from a received color image. Specifically, each of the pixel processing elements is covered with a red, a green, or a blue filter, according to a specific pattern, e.g., the "Bayer" CFA pattern used by Kodak®. As a result of the filtering, each pixel of the color image captured by a CMOS APS with CFA only contains one of the three colors.

An imaging system that employs the CMOS APS for sensing images typically has 8-bit or 12-bit resolution, whether monochrome or color. The resolution translates into a dynamic range of around 48–72 dB. The dynamic range determines the ratio of illumination between the brightest area and the darkest area an image can have for an image sensor to detect and process it without saturation.

It is desirable to maximize dynamic range. When the dynamic range is less than the contrast in an actual scene the image sensor may become saturated. When that happens, the image sensor cannot capture details from bright and dark areas of such an image at the same time. Adjusting or increasing the sensitivity of the dark areas may result in over-saturation of the bright areas, and conversely, adjusting or increasing the sensitivity of the bright areas may result in over-saturation of the dark areas.

SUMMARY

An image sensor for capturing and producing an image is disclosed. The image sensor amplifies pixel signal levels of the image, using two distinct gains to produce two output signal levels. A fusion module combines the two output signal levels in a way that may increase dynamic range.

Embodiments of this aspect of the invention may include one or more of the following features. The amplification circuitry may include two parallel gain amplifiers that provide the two distinct gains at the same time, or may include a single gain amplifier that provides the two distinct gains at different times. The fusion module is analog or digital. The image sensor further includes a time-multiplexed analog-to-digital converter that precedes the fusion module for performing digitization, or two parallel analog-to-digital converters that precede the fusion module for performing digitization. The two gains are chosen based on a predetermined degree of improvement in a dynamic range of the image sensor with respect to the output signal levels. The amplification circuitry and the fusion module may be located on a single chip.

In certain embodiments of this aspect of the invention, the amplification circuitry further includes switches that are controlled by a reset signal and a switch timing signal for the gain amplifier to provide the two distinct gains at different times, the switch timing signal leading the reset signal by a part of an overall cycle.

Another aspect describes a method of capturing and producing an image with an image sensor. The method includes: amplifying pixel signal levels of the image, using two distinct gains to produce two output signal levels; and combining the two output signal levels.

Embodiments of this aspect of the invention may include one or more of the following features. The amplifying may provide the two distinct gains at the same time or at different times. The combining is performed in analog or digitally. The combining of the two output signal levels may include adding the two output signal levels, or merging the two output signal levels. The amplifying further includes controlling the gain amplifier with a reset signal and a switch timing signal to provide the two distinct gains at different times, the switch timing signal leading the reset signal by a part of an overall cycle.

In certain embodiments of this aspect of the invention, the method further includes digitizing the two output signal levels by a time-multiplexed analog-to-digital converter before the combining, or digitizing the two output signal levels by two analog-to-digital converters before the combining. The two gains may be chosen based on a predetermined degree of improvement in a dynamic range of the image sensor with respect to the output signal levels.

Still another aspect describes an image sensing system for capturing and producing an image. The image sensing system includes: a photoreceptor array receiving light and producing a signal indicative thereof; readout circuitry amplifying said signal with two separate gains to produce two output signal levels; an analog-to-digital converter for digitizing the two output signal levels; and a fusion module for combining the two output signal levels.

Embodiments of this aspect of the invention may include one or more of the following features. The image sensing system further includes: a color filter array preceding the photoreceptor array to separate color information in the image; and a color processing unit following the fusion module to restore the color information. The photoreceptor array, the readout circuitry, the analog-to-digital converter, and the fusion module may be located on the same chip.

In certain embodiments of this aspect of the invention, the readout circuitry may include two parallel gain amplifiers to provide the two distinct gains at the same time, or may include a single gain amplifiers to provide the two distinct gains at different times.

Embodiments may have one of more of the following advantages. With these aspects of the invention, the CMOS active pixel sensors (APS) can have an extended dynamic range with a small amount of hardware. This allows the CMOS APS to be used for handheld digital cameras or video cameras.

Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
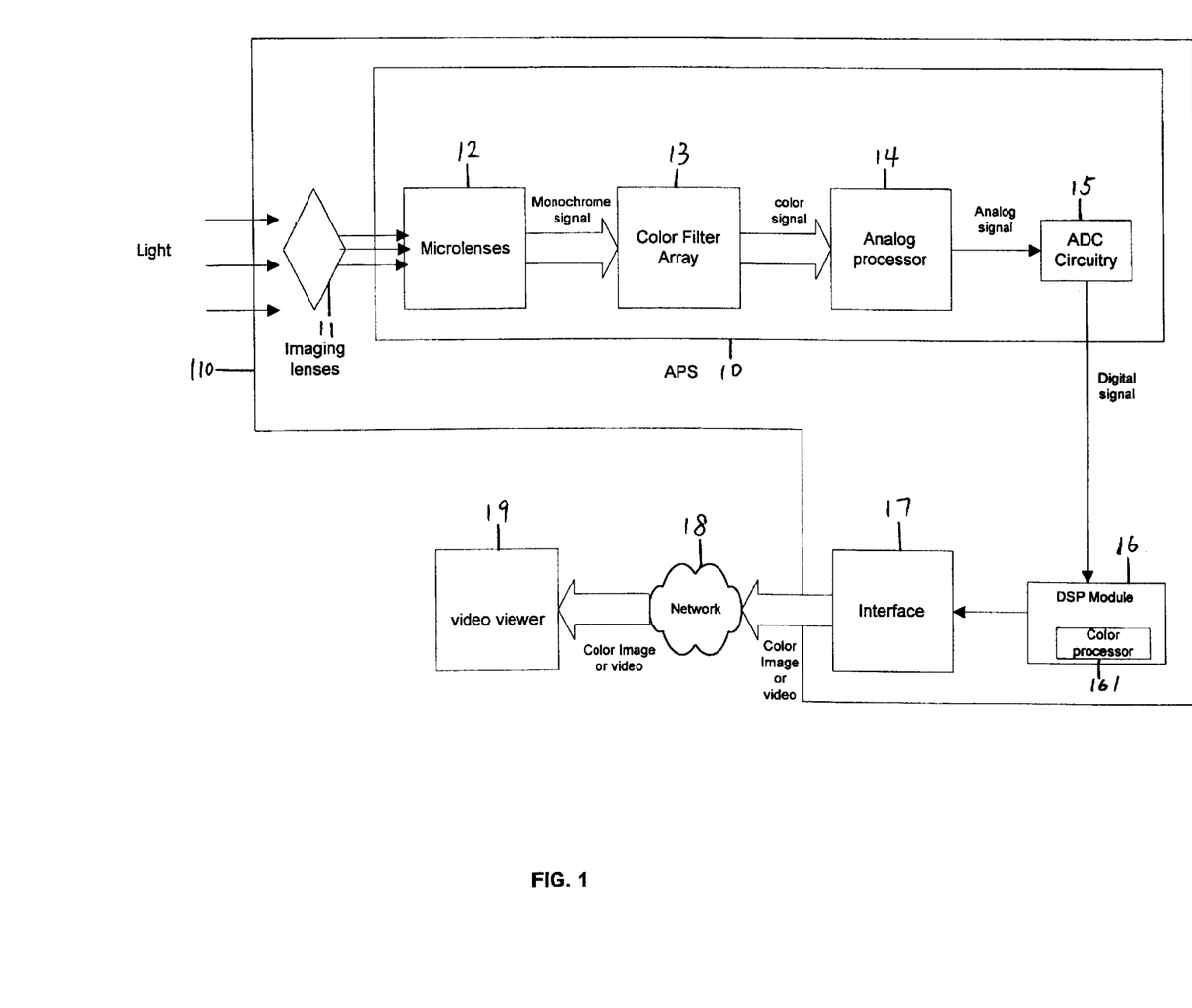
FIG. 1 is a block diagram for an image sensing system that captures and produces a digital image or video.

FIG. 1 shows an image sensing system 110 for capturing and displaying images. System 110 includes a CMOS active pixel sensor (APS) 10 that captures an image through an imaging lens 11 and an array of micro-lenses 12. In some systems, color filter array (CFA) 13 is included to process color images. APS 10 does not need to include CFA 13 if the APS only processes monochrome images. Both micro-lenses 12 and CFA 13 have an array structure in the form of an array of pixels. CFA 13 covers each pixel with a red, a green, or a blue filter. After the color filtering, photons of the captured image that passes through each of the pixels contains brightness information of only one of the three colors. Subsequently, an analog processor 14 receives the photons, converts the photons into photoelectrons, and then amplifies the signal level of the photoelectrons.

The process as described above may be performed in the analog domain. The output of analog processor 14 is a stream of analog signals, which is digitized by an analog-to-digital (ADC) circuitry 15 to form a stream of digital signals. The stream of digital signals is processed by a digital processing module 16. Digital processing module 16 can be implemented with digital signal processing (DSP) chips, with application-specific integrated circuits (ASIC) or as software programmed to perform the required DSP functions on a computer. For color images, digital processing module 16 includes a color processor 161 that performs a number of color processing techniques such as color interpolation, color correction, and removal of color crosstalk. The output of digital processing module 16 is sent to an interface 17, which converts the output into an image or a video with a format compatible to image or video display standards, e.g., CIF (Common Interface Format). The converted output is then displayed locally or remotely via a network 18 on a video viewer 19. APS 10 and DSP module 16 can fit into one single CMOS chip.

Figure 2:
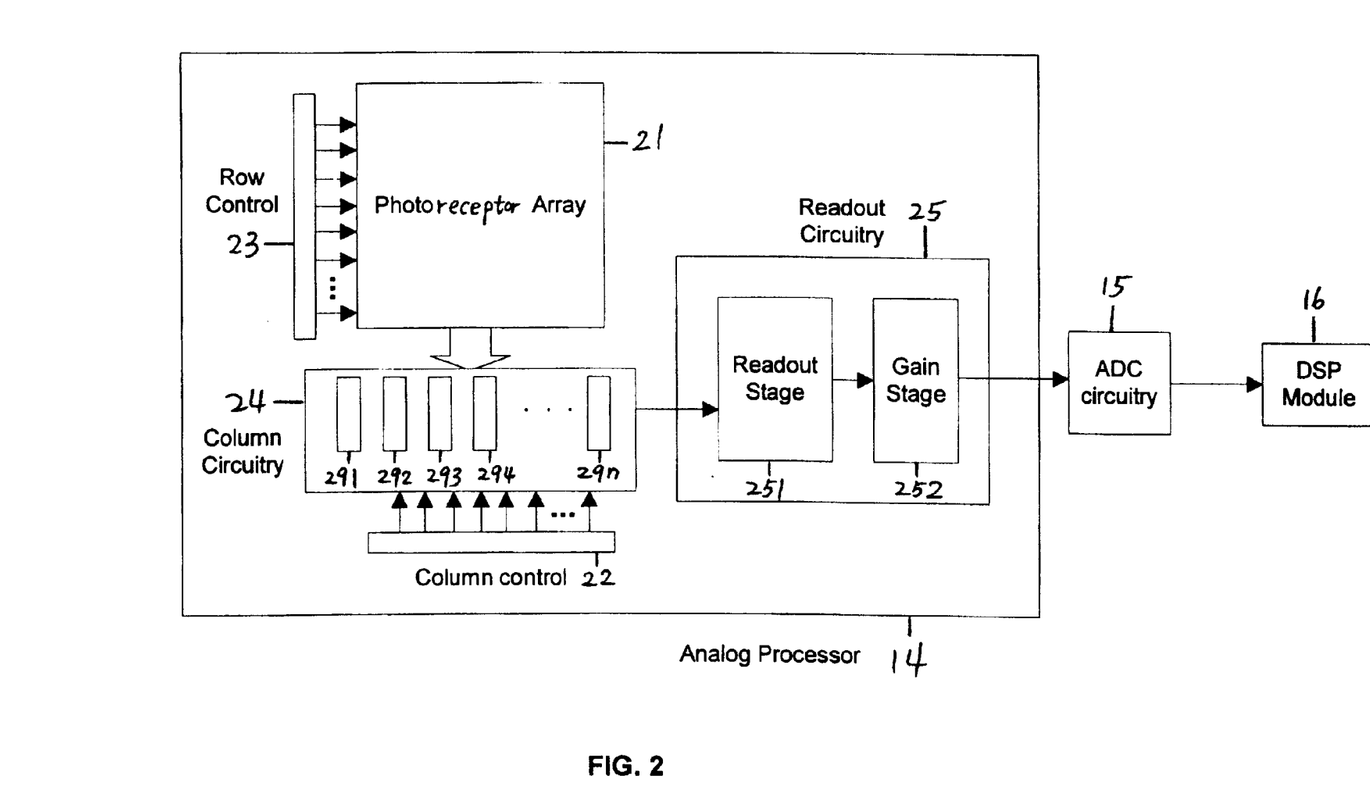
FIG. 2 illustrates a signal path in an analog processor that resides in the image sensing system.

FIG. 2 shows analog processor 14 which includes a photoreceptor array 21, a column control 22, a row control 23, a column circuitry 24, and a readout circuitry 25. Photoreceptor array 21, which may include photodiodes, photogates, or any other receptor, detects the photons coming from either micro-lenses 12 (for monochrome signals) or from color filter array 13 (for color signals). The receptor converts the photons into signals, e.g. charge. The elements in photoreceptor array 21 is then selected, one row at a time, by row control 23. The signals in the selected row are loaded into column circuitry 24 as a row of pixel signals. Column circuitry 24 includes column 291, 292, ..., 29n, each of which can store signal of one pixel in the selected row. Subsequently, column control 22 selects a column (291, 292, ... or 29n), one at a time, and sends the signal in the selected column to readout circuitry 25.

Readout circuitry 25 includes a readout stage 251 and a gain stage 252. Readout stage 251 serves as a buffer for storing the selected pixel signal. Gain stage 252 includes one or more amplifiers, e.g., switched capacitor amplifier, for amplifying the level of the signal from the selected column (291, 292, ... or 29n). The level of the signal is also called the pixel signal level.

Each pixel signal level is amplified with two different gains to produce two output signal levels. This can be used to assure that system 110 has a wide dynamic range. The two output signal levels can be combined to form a new signal level, which has the effect of an increased dynamic range of system 110.

More specifically, if the resolution of digital processing module 16 is n bits, where n is typically 8 or 12, the dynamic range of system 110, with one gain only, will be equal to 6n dB. When two gains, G1 and G2, where G2>G1, are applied in gain stage 252 for signal amplification, the overall dynamic range of system 110 can be increased to 6n+20 log (G2/G1).

Figure 3:
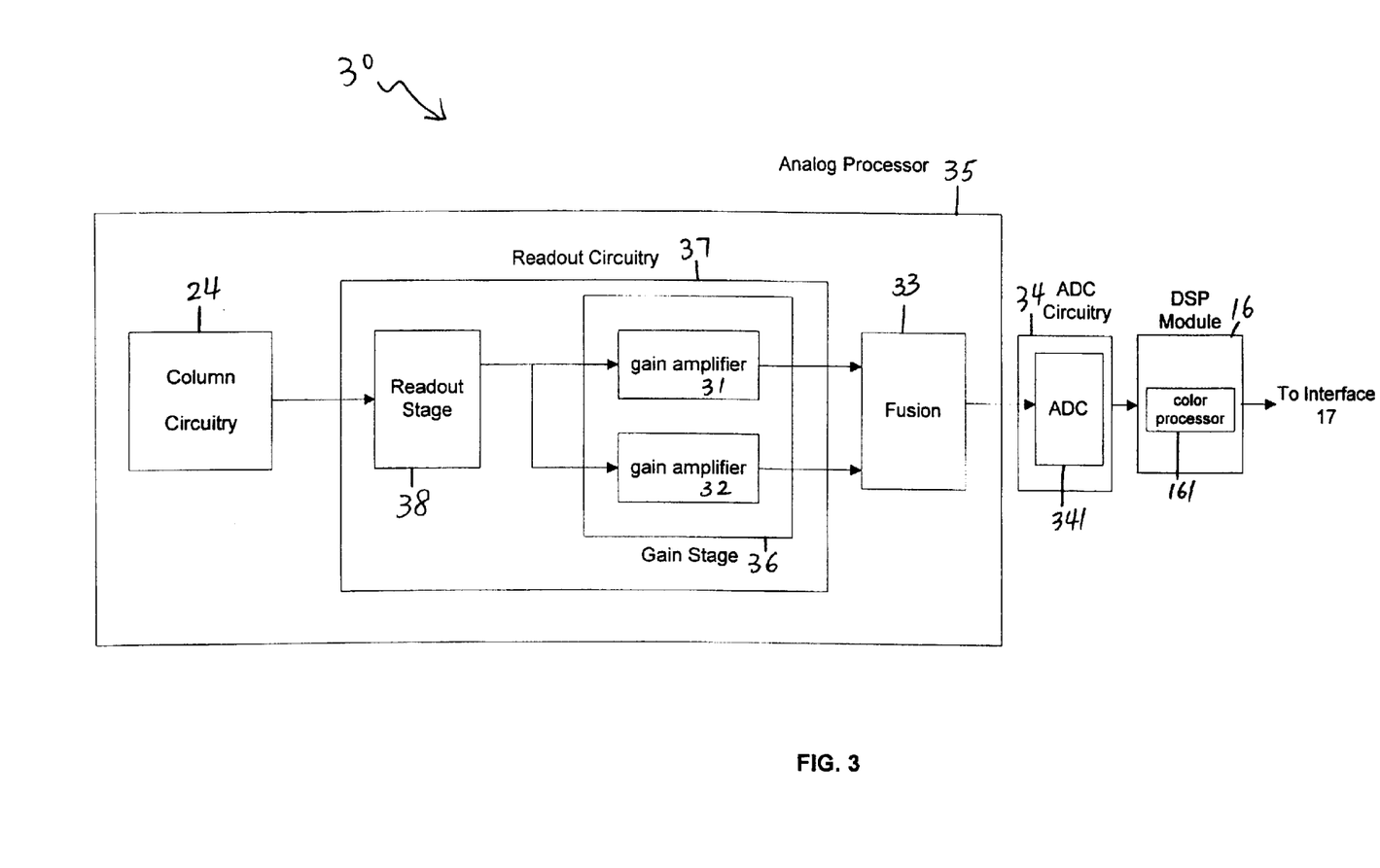
FIG. 3 illustrates an embodiment of the analog processor and the circuits to which the output of the analog processor is sent.

FIG. 3 shows a functional block 30, which is an embodiment of analog processor 14, ADC circuitry 15, and DSP module 16. Functional block 30 includes an analog processor 35, which includes a fusion module 33 and a readout circuitry 37. Readout circuitry 37 further includes a readout stage 38 and a gain stage 36 that contains two gain amplifiers 31 and 32, each with a different gain. For the same pixel signal level, gain amplifiers 31 and 32 produce two different output signal levels. A fusion module 33 carries out analog combination of these levels to produce a single signal level. The single signal level is digitized by ADC circuitry 34, which includes a single ADC 341.

Fusion module 33 combines the output signal levels by, for example, adding or merging the levels. Examples of fusion module 33 include an analog adder implemented with one or more switched capacitor amplifiers, or analog merging circuitry implemented with switched capacitor amplifiers and a multiplexer. Other fusion modules may be more complex.

The analog approach can make sure that the amount of information in the input to the ADC circuitry 34 and DSP module 16 does not increase due to the use of two gains. Impact on the size and power of system 110 is therefore minimized.

This analog approach may be suitable for both monochrome and color image sensors. As will be shown below with reference to FIG. 4, gain amplifiers 31 and 32 both have piecewise linear responses. Fusion module 33 preserves the piecewise linear characteristics. For color images, color processor 161 performs the necessary color processing steps in the piecewise linear region of the response curve even in the presence of fusion module 33. Therefore, artifacts in color images seldom occurs with the analog approach, except in border areas located between bright and dark areas of the images, or in rare cases where a single color is strongly favored in intensity.

Figure 4:
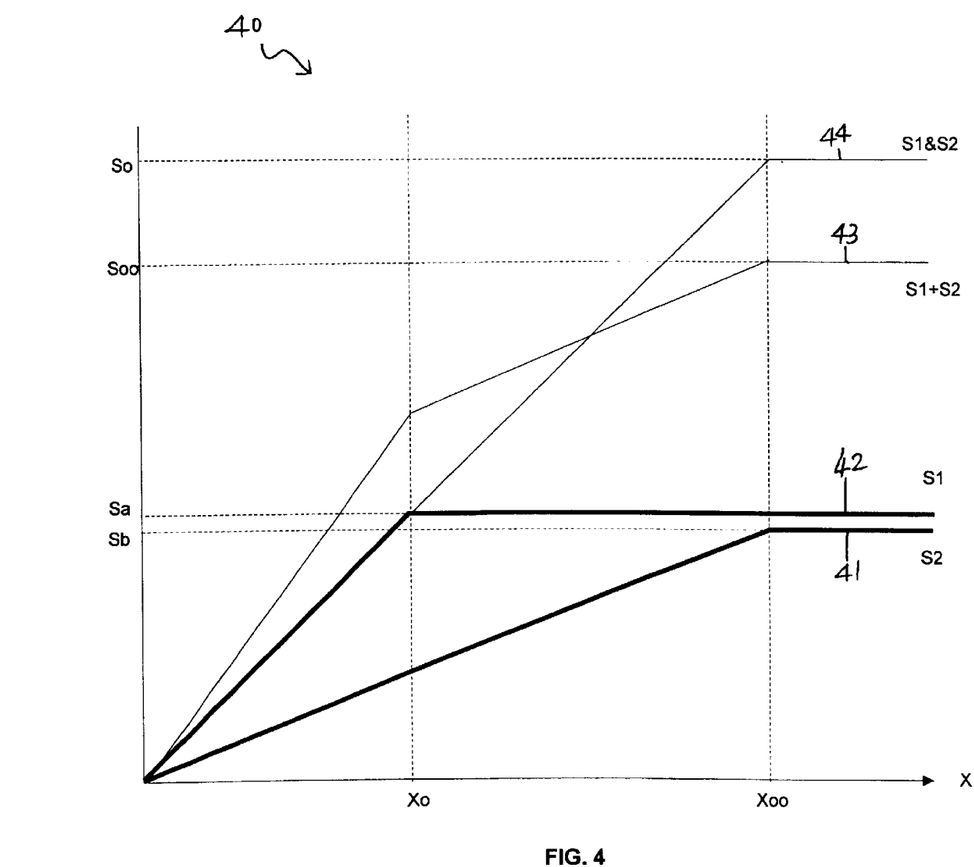
FIG. 4 is a response curve of the analog processor of FIG. 3.

FIG. 4 shows a response diagram 40 including four response curves 41, 42, 43, and 44. Response curves 41 and 42 indicate the output levels of gain amplifiers 31 and 32, respectively, for the same input signal X. When the illumination level of input signal X exceeds a specified input saturation point for each of gain amplifiers 31 and 32, the outputs of the gain amplifiers saturate at output saturation levels Sa and Sb, respectively. Let the gain for gain amplifier 31 be A, and the gain for gain amplifier 32 be B. The equations for the output levels, indicated by S1 and S2 for gain amplifiers 31 and 32, respectively, versus the illumination level of input signal X are as follows:

S1=AX for X<=Sa/A;

S1=Sa for X>Sa/A;

S2=BX for X<=Sb/B; and

S2=Sb for X>Sb/B.

FIG. 4 shows the input saturation point for gain amplifiers 31 and 32 being Xo and Xoo, respectively.

In one scenario, fusion module 33 combines S1 and S2 by performing an addition to form an added signal S1+S2. Response curve 43 represents the result of the addition.

Response curve 43 is monotonically increasing and piecewise linear with respect to increase in the illumination level of input signal X. Response curve 43 has three regions of responses, which include: a high gain region for S1+S2<=Xo; a low gain region for Xo<S1+S2<Xoo; and a saturation region for S1+S2>=Xoo. Response curve 43 reaches an output saturation level Soo at input saturation point Xoo.

The dynamic range of circuitry that generates response curves 42 (e.g., gain amplifier 31) is less than that of circuitry that generates response curves 43 (e.g., gain stage 36 and fusion module 33), by a factor Dr=Xoo/Xo. The output signal level of the latter circuitry is also increased by a factor Er=Soo/Sa. Because Soo=Sa+Sb=AXo+BXoo, Er can also be expressed as Er=1+(B/A)Dr. As a result, the ratio of the two gains B/A can be chosen, according to B/A=(Er−1)/Dr, to increase the dynamic range and the output signal level to desired values.

In another scenario, fusion module 33 combines S1 and S2 by performing a merging operation to produce a merged signal S1&S2. The merging operation is performed according to the following equation:

S1&S2=S1 for S1<=Xo;

S1&S2=S2×B/A for Xoo>S1>Xo; and

S1&S2=So for S>=Xoo.

FIG. 4 shows response curve 44 as the result of the merging operation. Response curve 44 has the same slope as S1 before S1's input saturation point Xo, and continues to have the same slope until response curve 44 saturates. Because the slope does not change before response curve 44 saturates, the response curve 44 is piecewise linear in only two regions, which includes a gain region for S1&S2<=Xoo and a saturation region for S1&S2>Xoo.

With either the adding or the merging approach, amplifying a signal with two gains and combining the results generated from the two gains increase the dynamic range and the output signal level. The increase can significantly enhance output image quality when the corresponding input image contains regions of high contrast.

Figure 5A:
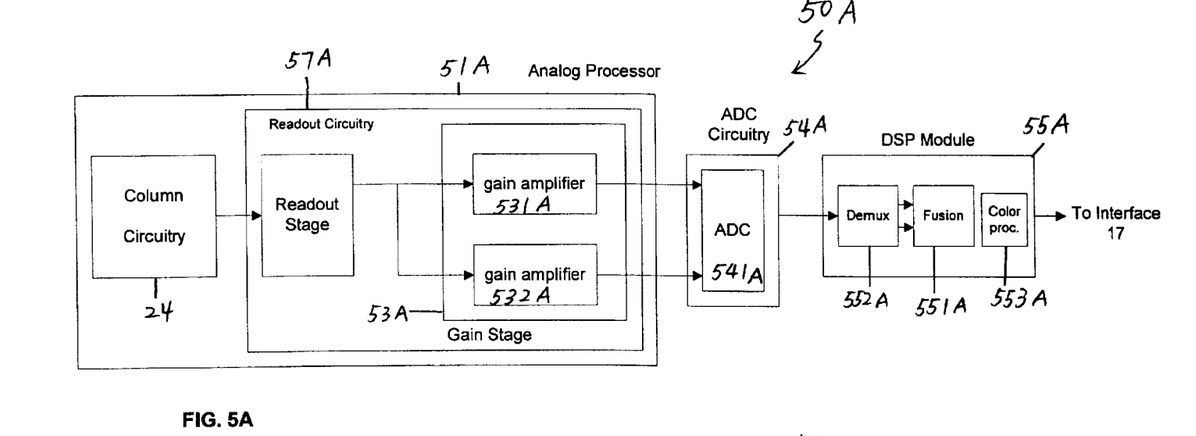
FIGS. 5A and 5B are two alternative embodiments of the analog processor and the circuits to which the output of the analog processor is sent.
Figure 5B:
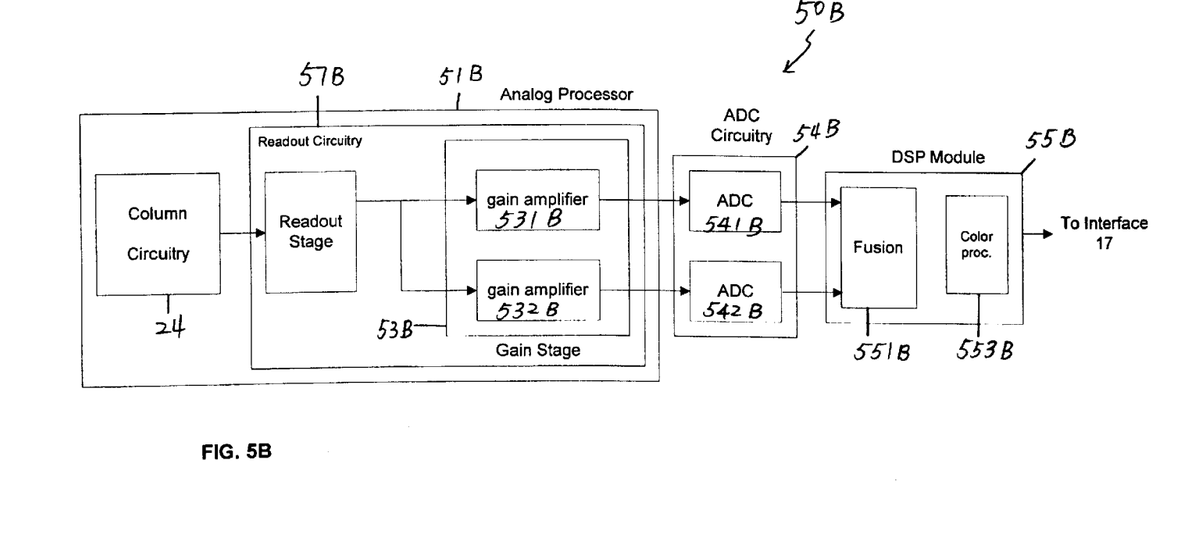

FIGS. 5A and 5B show functional blocks 50A and 50B as two alternative embodiments to functional block 30. Both of the embodiments include analog processors 51A and 51B, in which readout circuitry 57A and 57B reside, respectively. Functional blocks 50A and 50B further include ADC circuitry 54A and 54B, and DSP modules 55A and 55B, respectively.

Readout circuitry 57A and 57B respectively include gain stages 53A and 53B. Each of gain stages 53A and 53B has two gain amplifiers 531A, 532A, and 531B, 532B, respectively. Because input signals to gain stage 53A (or 53B) are amplified by the two gain amplifiers 531A and 532A (or 531B and 532B) before the signals are digitized, ADC circuitry 54A and 54B each receives two streams of analog signals, in contrast to the one stream of analog signals received by ADC circuitry 34. The two streams of analog signals require ADC circuitry 54A to run twice as fast as ADC circuitry 34, or require ADC circuitry 54B to include twice as much hardware, i.e., ADC 541B and 542B, as included by ADC circuitry 34.

ADC circuitry 54A may include only a single ADC 541A. Then, the digitized output of ADC 541A can be demultiplexed by a demultiplexer 552A before being sent to a fusion module 551A. For color images, results generated by fusion modules 551A and/or 551B can be respectively sent to color processors 553A and 553B for color processing.

Similar to fusion module 33, fusion module 551A and the corresponding fusion module 551B perform combining operations including additions and merging. However, in contrast to fusion module 33 which is an analog module, fusion modules 551A and 551B respectively reside in DSP modules 55A and 55B to combine pixel signal levels in the digital domain. Functional blocks 50A and 50B can generate the same response curves as the ones shown in FIG. 4.

Circuit diagrams for readout circuitry 57A will be described with reference to FIGS. 6 and 7. Although only readout circuitry 57A will be discussed, it should be understood that readout circuitry 57B and 37 can be implemented with the same circuitry.

Figure 6:
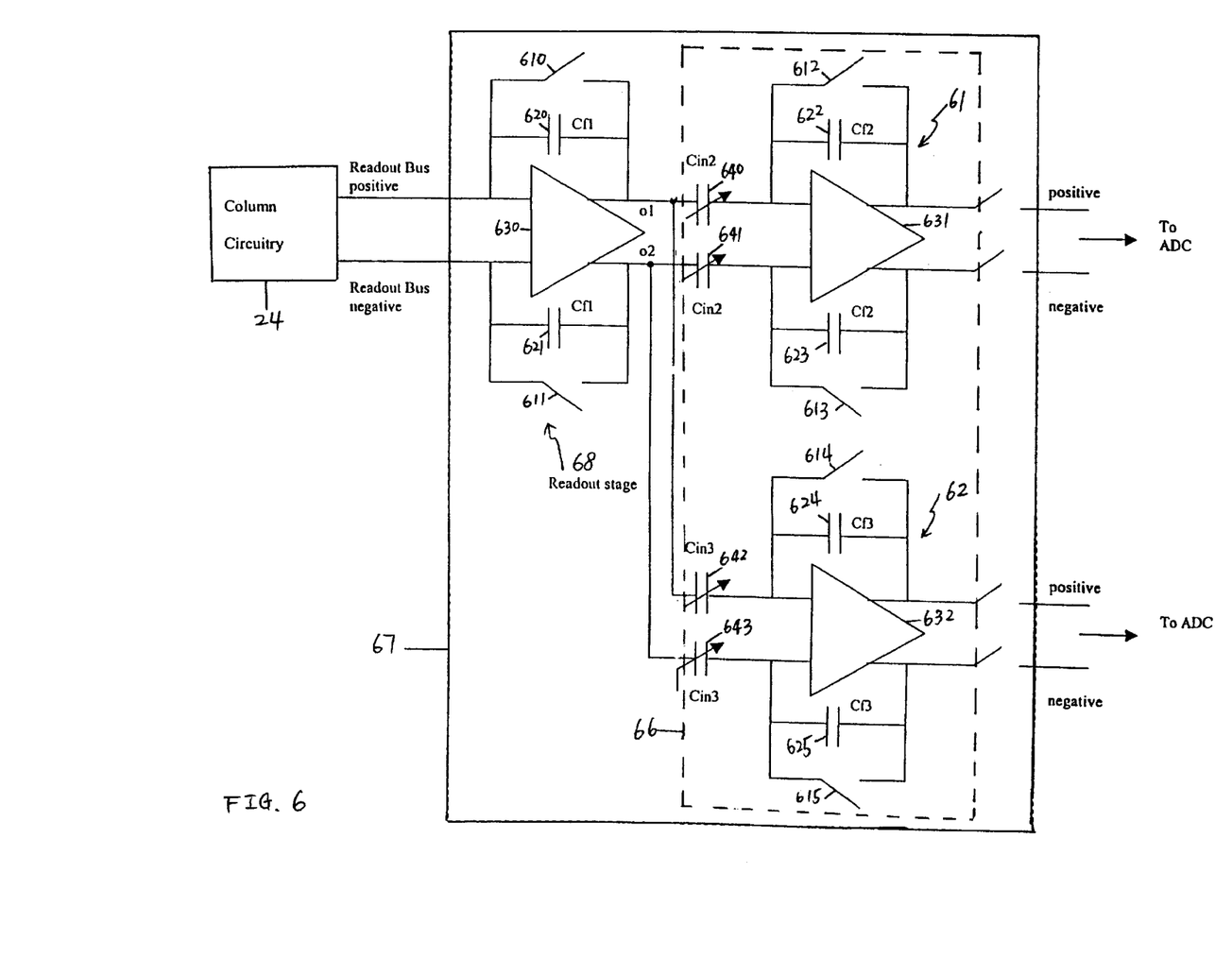
FIG. 6 is a circuit diagram for the embodiment of FIG. 3, FIG. 5A, and FIG. 5B.

FIG. 6 shows a circuit diagram for a readout circuitry 67 including a readout stage 68 and a gain stage 66. Readout stage 68 includes an operational amplifier 630, capacitors 620 and 621, and reset switches 610 and 611. Gain stage 66 includes capacitors 640, 641, 642, and 643, and two gain amplifiers 61 and 62. Each of gain amplifiers 61 and 62 has two reset switches 612, 613 (or 614, 615); two capacitors 622, 623 (or 624, 625); and an operational amplifier 631 (or 632). Reset switches 610–615 are controlled by a reset signal.

When the reset signal is high, all reset switches 610–615 are closed, thereby resetting the electrical charge stored in capacitors 620–625. As a result, the outputs of operational amplifiers 630, 631, 632 are reset to the same levels as their respective inputs. Capacitors 620 and 621 each have a capacitance of Cf1, which can store the charge read from column circuitry 24. Capacitors 622 and 623 each have a capacitance of Cf2, which together with capacitors 640 and 641, provide a gain Cin2/Cf2 to the corresponding pixel signal level. Similarly, capacitors 624 and 625 each have a capacitance of Cf3, which together with capacitors 642 and 643, provide a gain Cin3/Cf3 to the same pixel signal level.

When the reset signal goes low, all reset switches 610–615 are opened, causing the charge stored in a selected column (291, 292, . . . or 29n) of column circuitry 24 to be transferred to readout circuitry 68. As a result, output voltage of readout stage 68 measured at o1 and o2 shifts to a value proportional to the transferred electrical charges. The level of the electrical charges, i.e., the pixel signal level, in turn drives gain amplifiers 61 and 62, causing the output of the gain amplifiers to be equal to the output voltage of readout stage 68 multiplied by the gains of the gain amplifiers, which are Cin2/Cf2 and Cin3/Cf3, respectively. By choosing Cin2/Cf2 and Cin3/Cf3 appropriately, two levels of different sensitivities can be generated for each pixel signal level.

Figure 7:
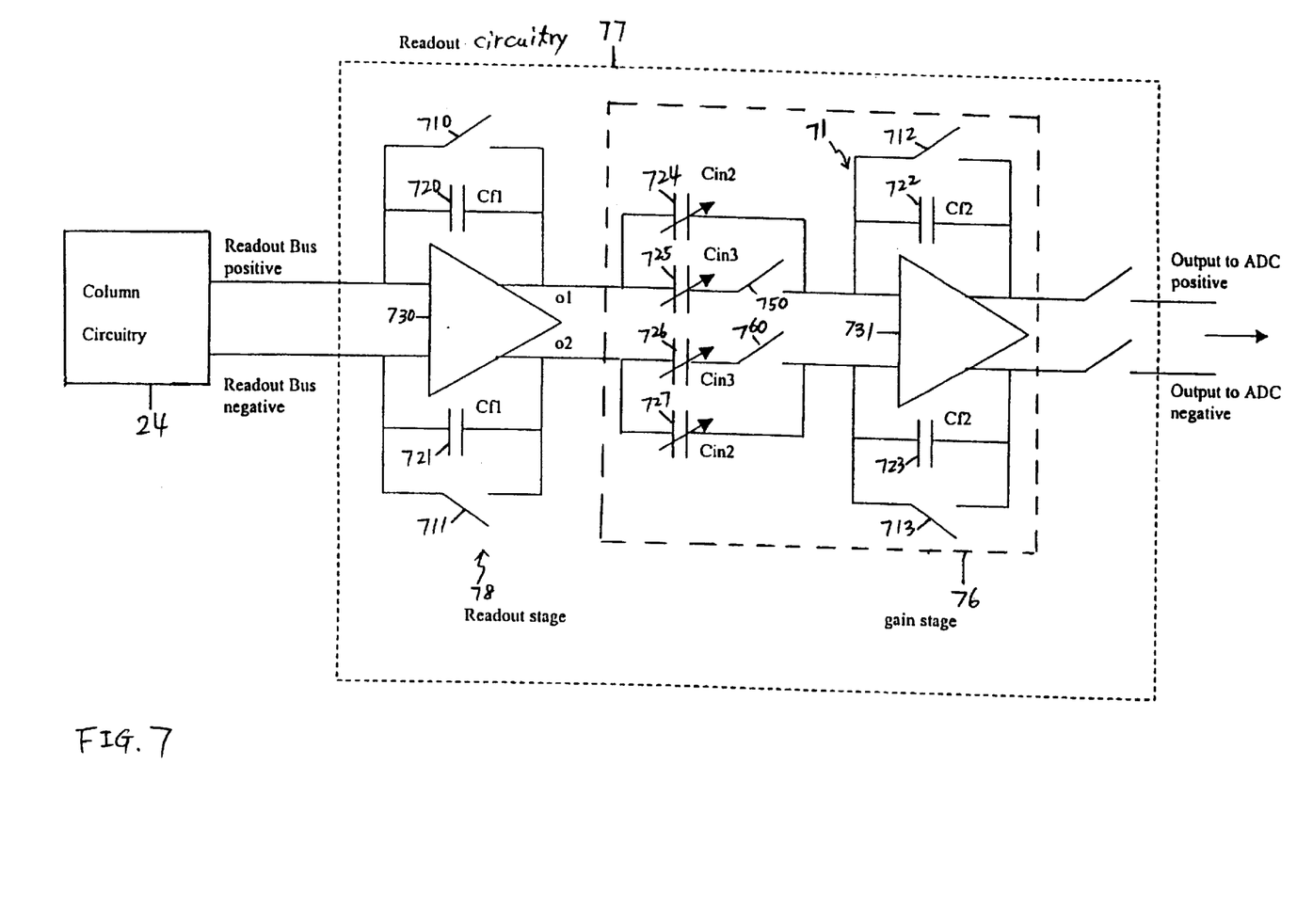
FIG. 7 is an alternative circuit diagram for the embodiment of FIG. 3, FIG. 5A, and FIG. 5B.

FIG. 7 shows another circuit diagram for a readout circuitry 77. In this embodiment, readout circuitry 77 includes a readout stage 78 and a gain stage 76 that has a single, time-multiplexed gain amplifier 71. Effectively, gain amplifier 71 performs the same function as gain amplifiers 61 and 62; however, only one stream of output is produced. Gain amplifier 71 houses an operational amplifier 731. Capacitors 722 and 723 are in the feedback loop. Reset switches 712 and 713 are respectively connected in parallel across capacitors 722 and 723. Similarly, readout stage 78 includes an operational amplifier 730 and capacitors 720, 721, which are also connected, in parallel, to reset switches 710 and 711, respectively. Reset switches 710–713 are controlled by the reset signal to reset the electrical charges in capacitors 720–723, and to also reset the output levels of operational amplifiers 730 and 731 to their respective input levels as described above with reference to FIG. 6. The output or input level of operational amplifier 730 (or 731), while being reset, is called a reset level of the operational amplifier.

Gain stage 76 further includes capacitors 724, 725, 726, and 727, which have capacitance of Cin2, Cin3, Cin3, and Cin2, respectively. Capacitors 725 and 726 are connected to gain amplifier 71 only when switches 750 and 760 are closed. When switches 750 and 760 are closed, gain stage 76 produces a total gain of (Cin2+Cin3)/Cf2. When switches 750 and 760 are open, gain stage 76 produces a total gain of Cin2/Cf2 only. By adjusting Cin2, Cin3, and Cf2, appropriate gains for gain stage 76 can be obtained.

Switches 750 and 760 are controlled by a switch timing signal, which coordinates with the reset signal to assure pixel signal levels are properly transferred to and amplified by readout circuitry 77. The coordination of the switch timing signal and the reset signal will be described below.

Figure 8:
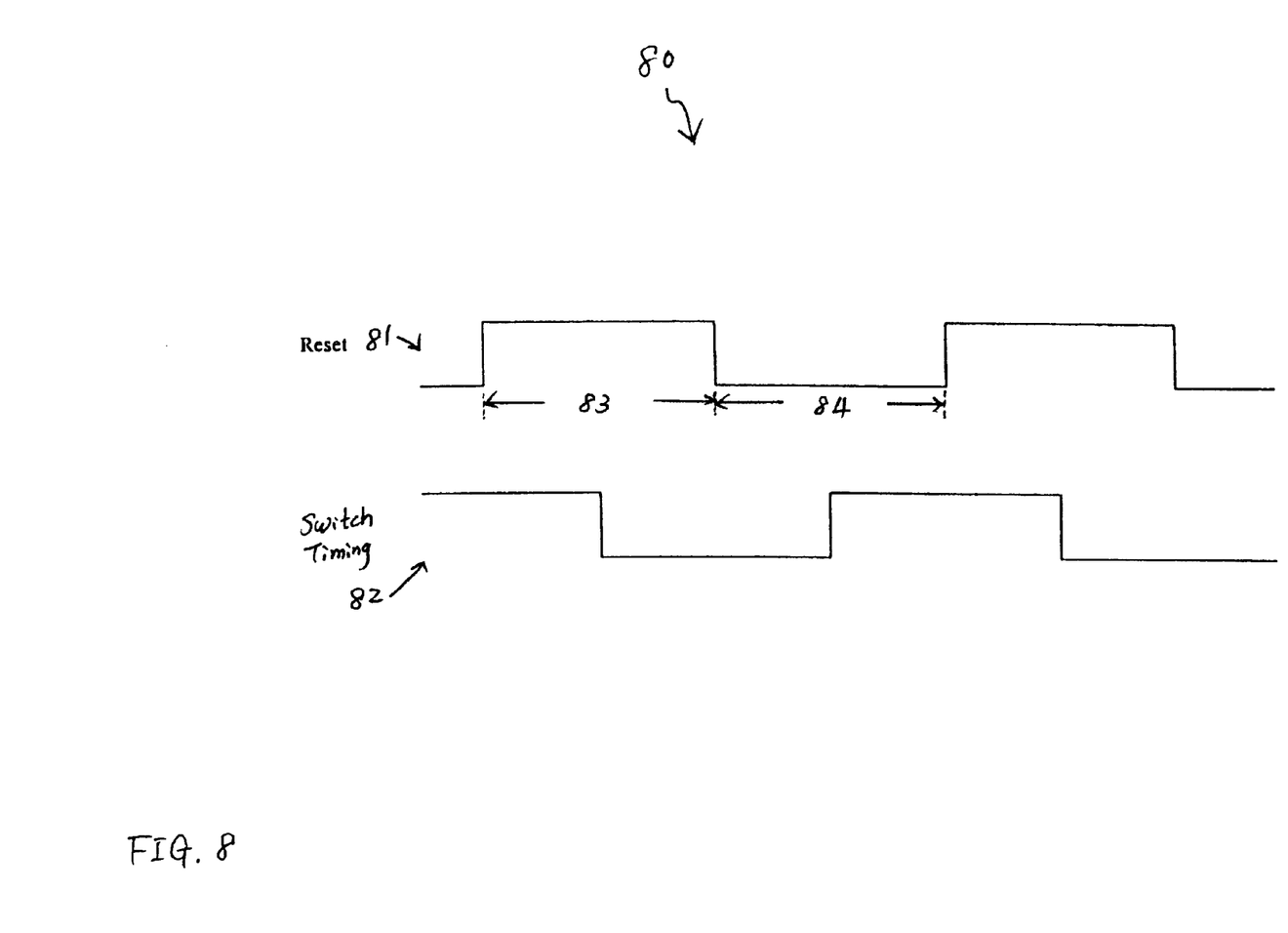
FIG. 8 is a timing diagram for operating the embodiment of FIG. 7.

FIG. 8 shows a timing diagram 80 which includes a reset signal 81 and a switch timing signal 82. Both reset signal 81 and switch timing signal 82 alternate between a high level, e.g., one, and a low level, e.g., zero. For either of reset signal 81 and switch timing signal 82, the time interval between the leading edge of a high level and the leading edge of the next high level is called an overall cycle. Switch timing signal 82 leads reset signal 81 by a part (e.g., a quarter) of an overall cycle. When reset signal 81 is high, which is called a reset phase 83, switch timing signal 82 is high for the first half of the reset phase, thereby closing switches 750 and 760 to reset the electrical charges stored in capacitors 724–727. Switch timing signal 82 becomes low for the second half of reset phase 83, thereby opening switches 750 and 760 to store the reset level of operational amplifier 731 across capacitors 725 and 726.

Reset signal 81 becomes low to signify the beginning of a gain phase 84. Switch timing signal 82 is low for the first half of the gain phase and high for the second half of the gain phase. The two different levels of switch timing signal 82 during gain cycle 84 provide a pixel signal level with two different gains, namely, (Cin2+Cin3)/Cf2S and Cin2/Cf2.

The output of readout circuitry 77 can be sent to a single ADC that runs at twice the speed of ADC 341. Alternatively, the output can be sent to a demultiplexer which splits the one streams of output into two streams of output signals, each being amplified by a distinct gain. The two streams of output can then be processed by two parallel ADCs, such as ADC 541B and 542B, or an analog fusion module, such as fusion module 33.

Accordingly, other embodiments are within the scope of the following claims.

What is claimed is:

1. An image sensor comprising:
   amplification circuitry comprising a single gain amplifier that provides two distinct gains at different times, said amplification circuitry receiving pixel based image signals, and amplifying some of the image signals with the two distinct gains, to produce two output signal levels; and
   a fusion module, operating to combine the two output signal levels in a way that increases an effective dynamic range of the image signals.

2. The image sensor of claim 1 further comprising a photoreceptor receiving light and producing a signal indicative thereof.

3. The image sensor of claim 1, wherein the amplification is controlled by a reset signal and a switch timing signal for the gain amplifier to provide the two distinct gains at different times, the switch timing signal leading the reset signal by some part of an overall cycle.

4. The image sensor of claim 1 wherein the fusion module is an analog circuit.

5. The image sensor of claim 1 wherein the fusion module is a digital circuit.

6. The image sensor of claim 5 further comprising a time-multiplexed analog-to-digital converter that precedes the fusion module producing a digital signal for said fusion module.

7. The image sensor of claim 5 further comprising two parallel analog-to-digital converters that precede the fusion module producing a digital signal for said fusion module.

8. The image sensor of claim 1 further comprising selecting the two gains based on a pre-determined degree of improvement in a dynamic range of the image sensor with respect to the output signal levels.

9. The image sensor of claim 1 wherein the amplification circuitry and the fusion module are located on a single chip.

10. A method comprising:
    amplifying pixel signal levels of an image using two distinct gains to produce two output signal levels, wherein the amplifying includes controlling a gain amplifier to provide the two distinct gains at different times; and
    combining the two output signal levels in a way that increases an effective dynamic range.

11. The method of claim 10 wherein the amplifying provides the two distinct gains at different times.

12. The method of claim 10 wherein the gain amplifier is controlled to provide the two distinct gains at different times by a switch timing signal which leads a reset signal by a part of an overall cycle.

13. The method of claim 10 wherein the combining is performed in an analog signal domain.

14. The method of claim 10 wherein the combining is performed in a digital signal domain.

15. The method of claim 14 further comprising digitizing the two pixel signal levels by a time-multiplexed analog-to-digital converter before the combining.

16. The method of claim 14 further comprising digitizing the two pixel signal levels by two analog-to-digital converters before the combining.

17. The method of claim 10 further comprising choosing the two gains based on a predetermined degree of improvement in a dynamic range of the image sensor and the output signal levels of amplification circuitry.

18. The method of claim 10 wherein the combining of the two output signal levels includes adding the two output signal levels.

19. The method of claim 10 wherein the combining of the two output signal levels includes merging the two output signal levels.

20. An image sensing system comprising:
    a photoreceptor array receiving light and producing a signal indicative thereof;
    readout circuitry amplifying said signal with two separate gains to produce two output signal levels, wherein the readout circuitry includes a single gain amplifier to provide the two separate gains at different times;

an analog-to-digital converter for digitizing the two output signal levels; and a fusion module for combining the two output signal levels in a way that increases an effective dynamic range of the image signals.

21. The image sensing system of claim 20 further comprising:

a color filter array preceding the photoreceptor array to separate color information in the image; and a color processing unit following the fusion module to restore the color information.

22. The image sensing system of claim 20 wherein the photoreceptor array, the readout circuitry, the analog-to-digital converter, and the fusion module are located on the same chip.

23. The image sensor system of claim 20 wherein the readout circuitry includes two parallel gain amplifiers to provide the two separate gains at the same time.

24. An image sensor comprising:

a pixel array for generating a plurality of pixel based image signals;

a color filter system, preceding the pixel array, for removing color information from the plurality of pixel based image signals;

amplification circuitry receiving the plurality of pixel based image signals, and amplifying at least some of the plurality of image signals with two distinct gains, to produce two output signals of different levels;

a fusion module, operating to combine the two output signals in a way that increases an effective dynamic range of at least some of the plurality of pixel based image signals; and a color processing circuit, following the fusion module, for restoring color information to the plurality of pixel based image signals.

25. A method comprising:

removing color information from pixel signal levels of an image;

after said step of removing, amplifying pixel signal levels of an image using two distinct gains to produce two output signal levels;

combining the two output signal levels in a way that increases an effective dynamic range; and after said step of combining, restoring color information to pixel signal levels of an image.

26. An image sensing system comprising:

a photoreceptor array receiving light and producing a signal indicative thereof;

readout circuitry amplifying said signal with two separate gains to produce two output signal levels;

an analog-to-digital converter for digitizing the two output signal levels;

a fusion module for combining the two output signal levels in a way that increases an effective dynamic range of the image signals;

a color filter array preceding the photoreceptor array to separate color information in the image; and a color processing unit following the fusion module to restore the color information.

* * * * *

UNITED STATES PATENT AND TRADEMARK OFFICE
CERTIFICATE OF CORRECTION

PATENT NO. : 6,734,905 B2
DATED : May 11, 2004
INVENTOR(S) : Eric R. Fossum et al.

It is certified that error appears in the above-identified patent and that said Letters Patent is hereby corrected as shown below:

Title page,
Itme [75], Inventors, the third inventor's name should read:
-- Sandor L. Barna --
Item [56], References Cited, FOREIGN PATENT DOCUMENTS, the first foreign patent document listed should be -A1 added as follows:
-- N JP-09184823-A1   07-1997   Japan   Tanaka   G01N 27/62 --

Signed and Sealed this

Twenty-seventh Day of July, 2004

JON W. DUDAS
*Acting Director of the United States Patent and Trademark Office*